United States Patent
Gollapudi et al.

(10) Patent No.: US 8,073,832 B2
(45) Date of Patent: Dec. 6, 2011

(54) ESTIMATING RANK ON GRAPH STREAMS

(75) Inventors: Sreenivas Gollapudi, Cupertino, CA (US); Rina Panigrahy, Sunnyvale, CA (US); Atish Das Sarma, Atlanta, GA (US)

(73) Assignee: Microsoft Corporation, Redmond, WA (US)

( * ) Notice: Subject to any disclaimer, the term of this patent is extended or adjusted under 35 U.S.C. 154(b) by 333 days.

(21) Appl. No.: 12/434,691

(22) Filed: May 4, 2009

(65) Prior Publication Data

US 2010/0281022 A1 Nov. 4, 2010

(51) Int. Cl.
*G06F 17/30* (2006.01)
(52) U.S. Cl. ..................................................... 707/706
(58) Field of Classification Search .................. 707/2, 3, 707/723; 715/501.1
See application file for complete search history.

(56) References Cited

U.S. PATENT DOCUMENTS

| | | | |
|---|---|---|---|
| 5,680,608 A * | 10/1997 | Chang et al. | 370/235 |
| 7,363,300 B2 | 4/2008 | Davis et al. | |
| 2005/0027685 A1* | 2/2005 | Kamvar et al. | 707/2 |
| 2005/0028080 A1* | 2/2005 | Challenger et al. | 715/501.1 |
| 2005/0120311 A1 | 6/2005 | Thrall | |
| 2007/0203789 A1* | 8/2007 | Jain et al. | 705/14 |
| 2007/0208730 A1 | 9/2007 | Agichtein et al. | |
| 2009/0037410 A1 | 2/2009 | Jones et al. | |
| 2009/0083222 A1* | 3/2009 | Craswell et al. | 707/3 |

OTHER PUBLICATIONS

Chen, et al., "Local Methods for Estimating Pagerank Values", Proceedings of the 13th ACM Conference on Information and Knowledge Management, Retrieved at <<http://delivery.acm.org/10.1145/1040000/1031248/p381-chen.pdf?key1=1031248&key2=9448516321&coll=GUIDE&dl=GUIDE&CFID=24546217&CFTOKEN=26970120>>, Nov. 8-13, 2004, pp. 381-389.

Guo, et al., "Efficient Multiple-Click Models in Web Search", Proceedings of the second ACM international conference on web search and data mining, Retrieved at <<http://research.microsoft.com/pubs/73115/Multiple-Click-Model-wsdm09.pdf>>, Feb. 9-12, 2009, pp. 8.

Rungsawang, et al., "Un-Biasing the Link Farm Effect in PageRank Computation", 21st International Conference on Advanced Networking and Applications, Retrieved at <<http://ieeexplore.ieee.org/ielx5/4220856/4220857/04220990.pdf?temp=x>>, May 21-23, 2007, pp. 8.

Agichtein, et al., "Identifying "Best Bet" Web Search Results by Mining Past User Behavior", Proceedings of the 12th ACM SIGKDD international conference on Knowledge discovery and data mining, Retrieved at <<http://www.mathcs.emory.edu/~eugene/papers/kdd2006.pdf>>, Aug. 20-23, 2006, pp. 7.

Radlinski, et al., "Query Chains: Learning to Rank from Implicit Feedback", Proceedings of the 11th ACM SIGKDD international conference on Knowledge discovery and data mining, Retrieved at <<http://www.cs.cornell.edu/people/tj/publications/radlinski_joachims_05a.pdf>>, Aug. 21-24, 2005, pp. 10.

(Continued)

*Primary Examiner* — Etienne Leroux

(57) ABSTRACT

The rank of nodes in a graph may be inferred from a calculated probability that each node in the graph appears in a single random walk of the graph. Short random walks may be generated for each node in the graph. The generated random walks may be combined to form a longer single random walk. Multiple single random walks may be generated in this fashion. The probability of each node appearing in a single random may be calculated from the generated single random walks. The rank of each node may then be inferred from the calculated probabilities.

18 Claims, 7 Drawing Sheets

OTHER PUBLICATIONS

White, et al., "Comparing Query Logs and Pseudo-Relevance Feedback for Web-Search Query Refinement", Proceedings of the 30th annual international ACM SIGIR conference on Research and development in information retrieval, Retrieved at <<http://research.microsoft.com/en-us/people/silviu/sigir07-3.pdf.>>, Jul. 23-27, 2007, pp. 2.

Chakrabarti, Soumen, "Web Search result' ranking: PageRank, HITS and related work", Retrieved at <<http://www.it.iitb.ac.in/~tejaswi/seminar/seminar.ps>>, Nov. 30, 2004, pp. 10.

Agichtein, et al., "Learning User Interaction Models for Predicting Web Search Result Preferences", Proceedings of the 29th annual international ACM SIGIR conference on Research and development in information retrieval, Retrieved at 21 <http://www.mathcs.emory.edu/~eugene/papers/sigir2006preferences.pdf>>, Aug. 6-11, 2006, pp. 8.

Brin, et al., "The Anatomy of a Large-Scale Hypertextual Web Search Engine", Retrieved at <<http://citeseerx.ist.psu.edu/viewdocs/summary?doi=10.1.1.42.3243>>, Apr. 1998, pp. 18.

Broder, Andrei, "A Taxonomy of Web Search", ACM SIGIR Forum, Retrieved at <<http://www.sigir.org/forum/F2002/broder.pdf>>, vol. 36, No. 2, 2002, pp. 8.

Craswell, et al., "An Experimental Comparison of Click Position-Bias Models", Proceedings of the international conference on Web search and web data mining, Retrieved at <<http://delivery.acm.org/10.1145/1350000/1341545/p87-craswell.pdf?key1=1341545&key2=5514426321&coll=GUIDE&dl=GUIDE&CFID=24703637&CFTOKEN=69444284>>, Feb. 11-12, 2008, pp. 87-94.

Claypool, et al., "Inferring User Interest", Retrieved at <<http://web.cs.wpi.edu/~claypool/papers/iui/iui.pdf>>, Aug. 31, 2001, pp. 17.

Dupret, et al., "Web Search Engine Evaluation Using Click-Through Data and a User Model", Proceedings of the Sixteenth International World Wide Web Conference, Retrieved at <<http://www2007.org/workshops/paper_28.pdf>>, May 8-12, 2007, pp. 4.

Fox, et al., "Evaluating Implicit Measures to Improve the Search Experience", ACM Transactions on Information Systems, Retrieved at <<http://delivery.acm.org/10.1145/1060000/1059982/p147-fox.pdf?key1=1059982&key2=7034426321&coll=GUIDE&dl=GUIDE&CFID=25371401&CFTOKEN=65758704>>, vol. 23, No. 2, Apr. 2005, pp. 147-168.

Joachims, Thorsten, "Optimizing Search Engines using Click through Data", The Eighth ACM SIGKDD International Conference on Knowledge Discovery and Data Mining, Retrieved at <<http://www.cs.cornell.edu/people/tj/publications/joachims_02c.pdf>>, Jul. 23-26, 2002, pp. 10.

Joachims, et al., "Accurately Interpreting Clickthrough Data as Implicit Feedback", Proceedings of the 28th annual international ACM SIGIR conference on Research and development in information retrieval, Retrieved at <<http://www.cs.cornell.edu/People/tj/publications/joachims_etal_05a.pdf>>, Aug. 15-19, 2005, pp. 10.

Kelly, et al., "Implicit Feedback for Inferring User Preference: A bibliography", ACM SIGIR Forum, Retrieved at <<http://www.sigir.org/forum/2003F/teevan.pdf>>, vol. 37, No. 2, 2003, pp. 11.

Pandey, et al., "Shuffling a Stacked Deck: The Case for Partially Randomized Ranking of Search Engine Results", In Proceedings of the 31st International Conference on Very Large Databases, Retrieved at <<http://www.cs.cmu.edu/~spandey/publications/randomRanking.pdf>>, 2005, pp. 13.

Radlinski, et al., "Minimally Invasive Randomization for Collecting Unbiased Preferences from Clickthrough Logs", Proceedings, The Twenty-First National Conference on Artificial Intelligence and the Eighteenth Innovative Applications of Artificial Intelligence Conference, Retrieved at <<http://www.cs.cornell.edu/People/tj/publications/radlinski_joachims_06a.pdf>>, 2006, pp. 7.

Richardson, et al., "Predicting Clicks: Estimating the Click-Through Rate for New Ads", Proceedings of the Sixteenth International World Wide Web Conference, Retrieved at <<http://delivery.acm.org/10.1145/1250000/1242643/p521-richardson.pdf?key1=1242643&key2-32 4534426321&coll=GUIDE&dl=GUIDE&CFID=24703957&CFTOKEN=38118872>>, May 8-12, 2007, pp. 521-529.

Zaragoza, et al., "Microsoft Cambridge at TREC-13: Web and Hard Tracks", In Proceedings of TREC 2004, Retrieved at <<http://trec.nist.gov/pubs/trec13/papers/microsoft-cambridge.web.hard.pdf>>, 2004, pp. 7.

* cited by examiner

200

ESTIMATING RANK ON GRAPH STREAMS

BACKGROUND

Modern search engines typically provide users with sets of search results that are responsive to a received query. The search results often include links to web pages or other resources that the search engine purports to be related to the received query. Typically, the search engine provides the search results in a ranked form, so that the user may focus on the search results that are deemed to be the best search results.

Many methods for ranking search results exist. For example, the rank of a web page may be based on the number of other web pages that link to it. Thus, a web page that has more web pages that link to it will have a higher rank then a web page that has fewer web pages that link to it.

The relationship between web pages in the Internet may be represented by a directed graph. The graph may include nodes that represent web pages and edges that represent links to web pages. The rank of the web pages represented by the nodes of the graph may then be calculated from the graph. Because the number of nodes in these graphs is often large, the graphs are typically not stored in main memory, but are presented as a graph stream. The rank of the nodes in the graph is then computed by making multiple passes over the graph stream. Current techniques for computing the rank of nodes from a graph stream having n nodes may use O(n) memory space and O(M) passes of the graph stream where M is the mixing time of the graph.

SUMMARY

The rank of nodes in a graph may be inferred from a calculated probability that each node in the graph appears in a single random walk of the graph. A plurality of short random walks may be generated for each node in the graph. The generated short random walks may be combined to form a longer single random walk. Multiple single random walks are generated in this fashion. The probability of each node appearing in a single random may be calculated from the generated single random walks. The rank of each node may then be inferred from the calculated probabilities.

In an implementation, a graph may be received. The graph may comprise a plurality of nodes and edges. A subset of the nodes in the graph may be selected. A random walk for each of the nodes in the subset of nodes in the graph may be generated. A random walk may include nodes reachable from a selected node in the subset of nodes by following edges of the graph starting from the selected node. The generated random walks may be appended together to create a single random walk. Appending the generated random walks together to create a single random walk may include selecting a first generated random walk, and determining if an end node of the first random walk is a stuck node. If the end node of the first random walk is not a stuck node, a second generated random walk may be selected that has a start node that is the same node as the end node of the first generated random walk and the second generated random walk may be appended to the first generated random walk. If the end node of the first random walk is a stuck node, the first random walk may be extended until a node that is not a stuck node is reached and a third generated random walk may be selected that has a start node that is the same node as the reached node of the extended first random walk. The third generated random walk may be appended to the first generated random walk.

In an implementation, a graph may be received. The graph may include a plurality of edges and nodes. A subset of nodes in the graph may be selected. A first plurality of single random walks of the graph may be generated. A probability that a node from the subset of nodes appears in a single random walk of the graph may be calculated using the generated first plurality of single random walks of the graph. A determination may be made of whether the calculated probability for the node converges with a previously calculated probability for the node. If the calculated probability for the node does not converge with a previously calculated node, a second plurality of single random walks of the graph may be generated and a probability that the node appears in a single random walk of the graph may be calculated using the generated second plurality of single random walks. The second plurality of single random walks may have twice the number of single random walks as the first plurality of single random walks. A rank of the node may be inferred from the determined probability.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
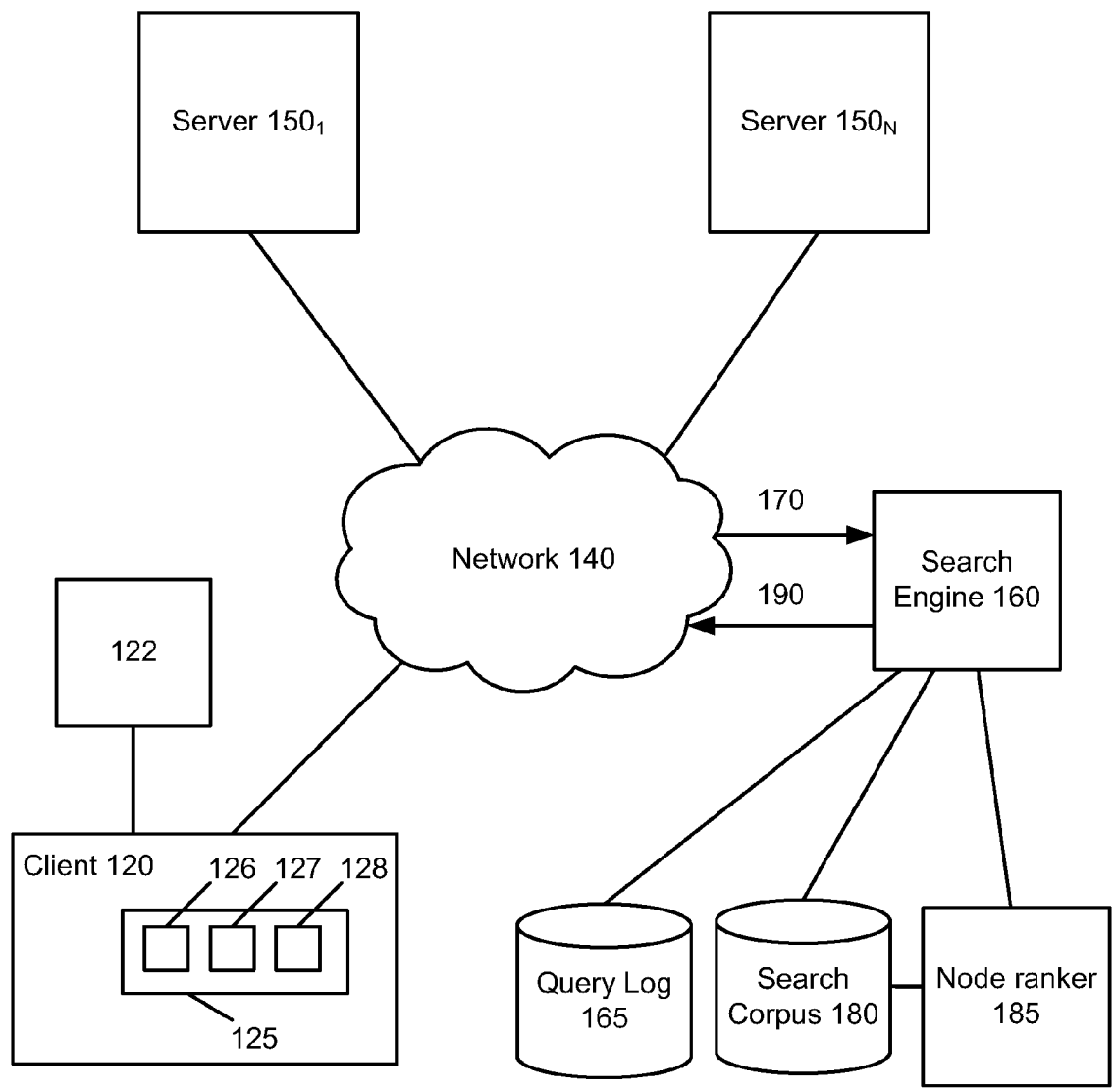
FIG. 1 illustrates an exemplary network environment.

FIG. 1 illustrates an exemplary network environment. In a network 100, a client 120 can may communicate through a network 140 (e.g., Internet, WAN, LAN, 3G, or other communication network), with a plurality of servers 150$_1$ to 150$_N$. The client 120 may communicate with a search engine 160. The client 120 may be configured to communicate with any of the servers 150$_1$ to 150$_N$ and the search engine 160 to access, receive, retrieve and display media content and other information such as web pages and web sites.

In some implementations, the client 120 may include a desktop personal computer, workstation, laptop, PDA, cell phone, or any WAP-enabled device or any other computing device capable of interfacing directly or indirectly with the network 140. The client 120 may run an HTTP client, e.g., a browsing program, such as MICROSOFT INTERNET EXPLORER or other browser, or a WAP-enabled browser in the case of a cell phone, PDA or other wireless device, or the like, allowing a user of the client 120 to access, process and view information and pages available to it from the servers 150$_1$ to 150$_N$.

The client 120 may also include one or more user interface devices 122, such as a keyboard, a mouse, touch-screen, pen or the like, for interacting with a graphical user interface (GUI) provided by the browser on a display (e.g., monitor screen, LCD display, etc.), in conjunction with pages, forms and other information provided by the servers $150_1$ to $150_N$ or other servers. Implementations described herein are suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like.

According to an implementation, a client application 125 executing on the client 120 may include instructions for controlling the client 120 and its components to communicate with the servers $150_1$ to $150_N$ and the search engine 160 and to process and display data content received therefrom. Additionally, the client application 125 may include various software modules for processing data and media content. For example, the client application 125 may include one or more of a search module 126 for processing search requests and search result data, a user interface module 127 for rendering data and media content in text and data frames and active windows, e.g., browser windows and dialog boxes, and an application interface module 128 for interfacing and communicating with various applications executing on the client 120. Further, the user interface module 127 may include a browser, such as a default browser configured on the client 120 or a different browser.

According to an implementation, the search engine 160 is configured to provide search result data and media content to the client 120, and the servers $150_1$ to $150_N$ are configured to provide data and media content such as web pages to the client 120, for example, in response to links selected in search result pages provided by the search engine 160. The search engine 160 may reference various collection technologies for collecting information from the Internet and for populating one or more indexes with, for example, web pages, links to web pages, etc. Such collection technologies include automatic web crawlers, spiders, etc., as well as manual or semi-automatic classification algorithms and interfaces for classifying and ranking web pages within a hierarchical structure. In certain aspects, the search engine 160 may also be configured to interface with a node ranker 185 that processes and ranks web pages using algorithms, such as for example, the PageRank™ algorithm. The search engine 160 may also record search queries in the form of a query log 165.

In an implementation, the search engine 160 may be configured to provide data responsive to a search query 170 received from the client 120, via the search module 126. The servers $150_1$ to $150_N$ and 160 may be part of a single organization, e.g., a distributed server system such as that provided to users by search provider, or they may be part of disparate organizations. The servers $150_1$ to $150_N$ and the search engine 160 each may include at least one server and an associated database system, and may include multiple servers and associated database systems, and although shown as a single block, may be geographically distributed.

According to an implementation, the search engine 160 may include algorithms that provide search results to users in response to the search query 170 received from the client 120. The search engine 160 may be configured to increase the relevance of the results of search queries received from client 120, as discussed in detail below. The search query 170 may be transmitted to the search engine 160 to initiate an Internet search (e.g., a web search). The search engine 160 locates content matching the search query 170 from a search corpus 180. The search corpus 180 represents content (e.g., web pages) that is accessible via the World Wide Web, the Internet, intranets, local networks, and wide area networks.

The search engine 160 may retrieve content from the search corpus 180 that matches search the query 170 and transmit the matching content (i.e., search results 190) to the client 120 in the form of a web page to be displayed in the user interface module 127. In some implementations, the most relevant search results are displayed to a user in the user interface module 127. In some implementations, the search results may be presented according to a calculated rank associated with the documents.

The rank of a particular document may be calculated by the node ranker 185. The rank of a web page may be calculated by the node ranker 185 using a graph representing the web pages indexed and/or identified by the search corpus 180. An example graph may include one or more nodes representing web pages and one or more edges representing links. The node ranker 185 may generate short random walks of the graph and use the short random walks to generate multiple larger single random walks of the graph. The multiple single random walks may then be used to calculate the probability that each node in the graph appears in one of the single random walks. The web pages represented by the nodes may then be ranked according to the calculated probabilities for the nodes. The rank of a particular node and the web page or document that it represents may also be inferred from the calculated probability for that node.

Figure 2:
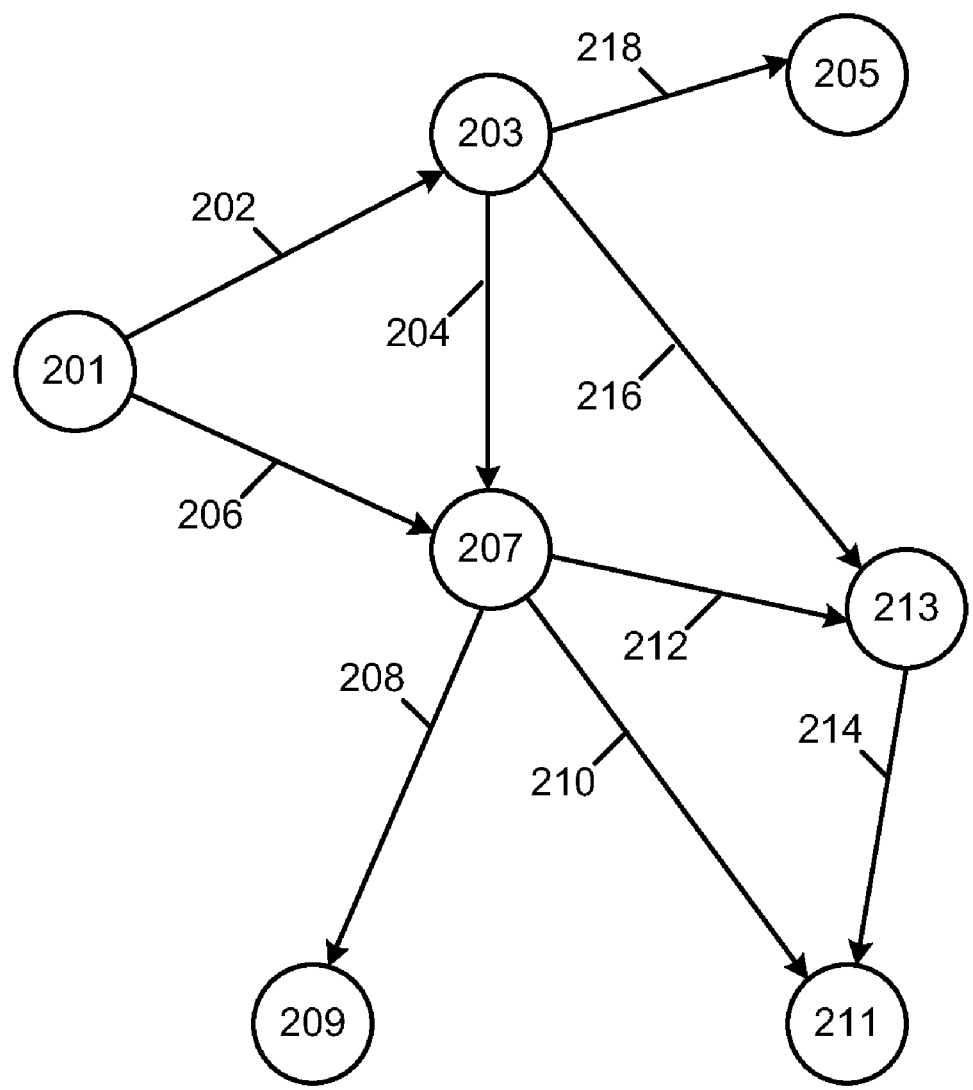
FIG. 2 illustrates an exemplary graph.

FIG. 2 in an illustration of an exemplary graph 200. The graph 200 may represent a plurality of web pages or documents. The graph 200 includes nodes 201, 203, 205, 207, 209, 211, and 213. Each node of the nodes 201-213 may represent a web page or document that is part of the search corpus 180. The graph 200 further includes one or more edges 202, 204, 206, 208, 210, 212, 214, 216, and 218. Each of the edges 202-218 from one of nodes 201-213 may represent a link from a web page or document represented by the node to another one of nodes 201-213. While the graph 200 is shown having only seven nodes and nine edges, it is for illustrative purposes only. There is no limit to the number of nodes that may be supported. For example, typical node graph 200 representing a subset of the web pages available on the Internet may include millions of nodes 201-213.

As described with respect to FIG. 1, the node ranker 185 may generate a rank for one or more web pages represented by the nodes 201-213 in the graph 200. In some implementations, the rank of a node may be inferred from the probability that the node is part of a random walk of length l through the graph 200. For example, a random walk of length four starting from the node 201 may travel to node 203 by following edge 202, may then travel to node 207 by following edge 204, may then travel to node 213 by following edge 212, and may then travel to node 211 by following edge 213. In some implementations, the particular edge selected to follow in a random walk may be pseudo-randomly selected. For example, at node 201 whether to follow edge 202 or edge 206 may be decided by using a pseudo-random algorithm with an approximately 50% chance of choosing either edge 202 or edge 206. At node 207 whether to follow edge 208, 210, or 212 may be decided by a pseudo-random algorithm with an approximately 33% chance of choosing any of edges 208, 210, or 212. Any known method or technique for making pseudo-random selections may be used.

Because the graph 200 may be large (i.e., includes a large number of edges and nodes) it may be impractical to generate random walks of length l to calculate the probability of a node appearing a random walk by processing the entire graph 200 in memory. Thus, the graph 200 may be streamed and processed node by node and edge by edge. In some implementations, the graph 200 is received as a random stream, where the nodes and edges are placed in the stream in no particular order or relation to one another. Accordingly, to generate a random walk of length l, a pass may be made of the stream representing the graph 200 for each step in the random walk of length l. Thus, for graph 200 having n nodes, a random walk of length l may take $O(n \times l)$ time.

In order to reduce the amount of time used to perform a random walk of length l, shorter random walks of length $\omega$ may be generated and appended together to form a random length of approximately l length. Rather than perform a random walk of length four, two random walks of length two may generated and connected to form a walk of length four. For example, a first random walk of length two may be performed starting from the node 201 and ending at the node 207. A second random walk of length two starting at the node 207 and ending at the node 211 may be generated and appended to the first random walk to form a random walk of length four from two random walks of length two. Each smaller random walk may be performed in parallel with one another, thus reducing the time used to produce the random walk of length l and reducing the overall number of passes that are made over the graph 200. Performing a single random walk of length l from multiple shorter random walks is described in more detail with respect to FIG. 3.

Figure 3:
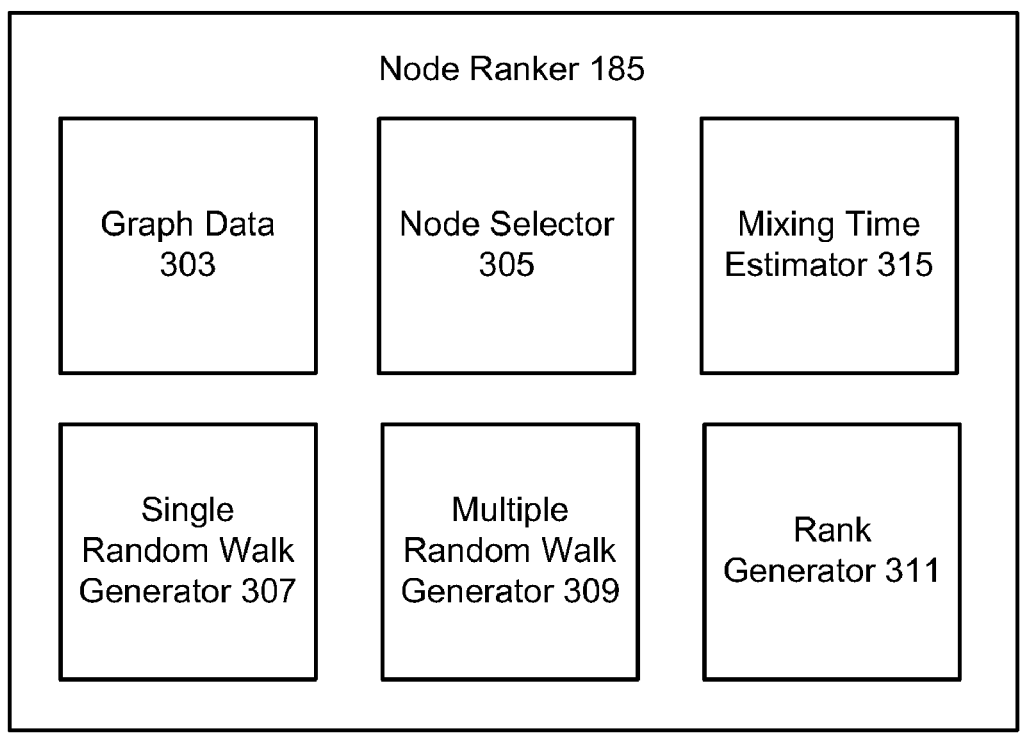
FIG. 3 is a block diagram of an exemplary node ranker.

FIG. 3 is a block diagram of an exemplary node ranker 185. The node ranker may be adapted to rank nodes in a node graph, such as the node graph 200 illustrated in FIG. 2. The node ranker 185 may be implemented by a computer device such as the computing device 700 illustrated with respect to FIG. 7, for example. While the node ranker 185 is described with respect to calculating the rank of nodes in a node graph where the node graph represents web pages in the Internet, it is for illustrative purposes only. The node ranker 185 may be used to rank nodes in any graph. For example, the node ranker 185 may be used to rank nodes in graphs representing social network applications, search engine query logs, click logs, and large document collections, etc.

The node ranker 185 may include graph data 303. The graph data 303 may describe nodes connected to one another by one or more edges. In some implementations, the graph data 303 may represent a subset of web pages on the Internet, such as the web pages indexed by the search corpus 180. For example, each node in the graph data 303 may represent a web page. Each out edge from a node in the graph data 303 may represent a link from that web page to another web page, and each in edge to a node in the graph data 303 may represent a link from another web page to that web page. The graph data 303 may have been generated by the search engine 160 from the search corpus 180, or may have been generated by the node ranker 185, for example.

In some implementations, the graph data 303 is a randomized edge stream. For example, the graph data 303 may be randomly streamed from the search engine 160 or the search corpus 180 such that the edges of the graphs are received in a random order, rather than in a regular or arbitrary order. As described above, a graph representing web pages on the Internet may include millions of nodes and edges. Thus, it may be impractical to store the entire graph represented by the graph data 303 in memory. In order to facilitate the processing of the graph represented by the graph data 303, the graph data 303 may be streamed from the search engine 160 or the search corpus 180. The node ranker 185 may then process portions of the graph data 303 as it is received in the random stream. Other types of edge streams may be used, such as arbitrary or regular edge streams.

In other implementations, rather than a stream, some or all of the graph data 303 may be stored by the node ranker 185. Any type of data structure known in the art for storing graphs may be used. The stored graph data 303 may then be streamed from the graph data 303 to one or more of the components of the node ranker 185 for processing, for example.

The node ranker 185 may further include a node selector 305. In some implementations, the node selector 305 may select a subset of the nodes of the graph represented by the node graph data 303. The nodes in the subset of nodes may be selected from the nodes of the node graph data 303 according to a probability $\alpha$. For example, if $\alpha$ is 1, then every node in the graph data 303 will be in the selected subset of nodes because a particular node in the graph data 303 has a probability of 1 of being selected. Similarly, if $\alpha$ is 0.50, then any node in the node graph data 303 has a 50% probability of being selected and the subset of nodes may include 50% of the nodes from graph data 303, for example.

The particular probability selected for a may be specified by a user or administrator, and may be based on a variety of factors and considerations including the computational resources available, the size of the graph represented by the graph data 303, and the desired level of accuracy. For example, where the graph data 303 represents web pages on the Internet, there may be several million nodes in the graph. Further, a user or administrator may be satisfied by a relatively low level of accuracy for the computed probability that a node is part of a random walk of the graph represented by the node data 303. Thus, for the scenario described, the value of a may be relatively low because of the large number of nodes and a de-emphasis on accuracy. In other scenarios, where a high level of accuracy is desired, a relatively high value of a may be specified.

The node ranker 185 may further include a single random walk generator 307. The single random walk generator 307 may generate random walks from each of the nodes in the subset of the nodes selected by the node selector 305 and combine the random walks to generate a single random walk. As described in FIG. 2, a random walk may be a path through the graph starting at a selected node from the subset of nodes and continuing to different nodes of the graph by following out edges from the nodes to different nodes. The length of the walk is the number of edges that are followed in the random walk.

For example, where the nodes represent web pages, a random walk of length three may begin at a randomly selected first web page. A link on the first web page may be randomly selected that leads to a second web page. A link on the second web page may be randomly selected that leads to a third web page. A link on the third web page may be selected that leads to a fourth web page. The random selection of links that starts at the first web page and ends at the fourth web page is a random walk of length three, for example.

In some implementations, the single random walk generator 307 may generate a random walk of length l by making several random walks of length $\omega$ and connecting the random walks of length $\omega$ together to generate the single random walk of length l. The length selected for l and $\omega$ may be determined by the number of nodes in the graph and a calculated mixing time of the graph. In some implementations, the value of l may be approximately 10 times the value of $\omega$. For example, the value of l may be 200 and the value of $\omega$ may be 20. In some implementations, the value of $\omega$ may be approximately equal to the value of the √l. Thus, the random walk of length l is longer than each random walk of length ω.

In some implementations, the single random walk generator 307 may make multiple walks of length ω of the subset of nodes selected by the node selector 305. For each random walk of length ω, the single random walk generator 307 may start at a node from the subset of nodes and make a random walk of length ω from the start node by following randomly selected edges from the node graph data 303 until a walk of length ω is reached.

Where the graph data 303 is received as a randomized edge stream, the single random walk generator 307 may extend a random walk by an edge for each pass of the randomized edge stream. Thus, a random walk of length ω may be generated from a graph having n nodes in O(n×ω) time. In some implementations, the single random walk generator 307 may generate all or some of the random walks of length ω in parallel, thus reducing the time used to generate a single random walk of length l.

In some implementations, the single node generator 307 may generate an array, table, or other data structure, with an entry for each of the nodes in the subset of nodes selected by the node selector 305. For example, if there are 1,000,000 nodes in the subset of nodes selected by the node selector 305, then the table may have 1,000,000 entries. When the single node generator 307 performs a random walk of length ω from a selected node from the subset of nodes, the single node generator 307 may make an entry for the random walk of length ω in the table at a location associated with the selected nodes. In some implementations, the entry may include all of the edges and/or nodes traversed during the random walk of length ω. In other implementations, only the last node in the walk of length ω may be included in the entry in the table.

The single node generator 307 may generate a single random walk of length l by combining the generated single random walks of length ω for each of the nodes in the subset of nodes selected by the node selector 305. For example, the single random walk of length l may be generated by first selecting a start node from the subset of nodes. The entry for the selected start node may be located in the table, and the random walk of length ω associated with the start node may be used as the beginning of the random walk of length l. The start node may then be removed from the table, or a notation may be made that the random walk of length ω associated with the node in the table has already been used in the generation of the random length walk of length l. The last node in the random walk of length ω from the start node (i.e., the first section of the random walk of length l) may be determined. The entry in the table corresponding to the last node may be located in the table, and the walk of length ω associated with the last node is appended to the random node of length l. The singe random walk generator 307 may continue appending random walks until the single random walk generator 307 has appended the random walks of length ω for all of the nodes having entries in the table to create the single random walk of length l.

In some implementations, the table may include only the end node for reach random walk of length ω. For these implementations, rather than storing the edges and nodes that comprise the single random walk, the values of pseudo-random "coin tosses" or other pseudo-random deciders that were used to select the edges to follow in the random walk of length ω may be stored. The random walk of length ω, given the start node, may then be recreated using the stored pseudo-random deciders. For example, at each node, the pseudo-random number that was used to chose an out edge to follow is stored, rather than the actual out edge. When the random walk of length ω is subsequently recreated, the pseudo-random numbers that were used to choose an out edge from each node is reused, resulting in the same out edge being selected. Thus, the original single random walk of length ω may be recreated using the pseudo-random number or decider used by the single random walk generator 307 to select an out edge at each node in the original single random walk of length ω.

Storing the pseudo-random deciders for each step in the single random walk of length ω may use less storage than storing the selected out edges because the pseudo-random numbers may be simple numerical values while the out edges may include URLs, or other text, depending what the graph purports to represent. However, recreating the single random walk of length ω may use additional computing resources than simply storing the edges and nodes of the single random walk of length ω.

The single random walk generator 307 may generate a single random walk of length l by appending generated single random walks of length ω. However, the process described above for appending single random walks of length ω may fail when an end node of a single random walk ω is a "stuck node". A stuck node may be an end node of a single random walk of length ω that is either not in the subnet of nodes selected by the node selector 305 (i.e., is not a node with an entry in the table and selected by the node selector 305), or is an end node of a single random walk of length ω that has already be used to generate the single random walk of length l (i.e., was already removed from the table). Thus, the single random walk generator 307 may be further adapted to recover from stuck nodes encountered while generating the single random walk of length l from the single random walks of length ω.

In some implementations, the single random walk generator 307 may recover from a stuck node at the end of a single random walk of length ω by extending the single random walk of length ω until a new end node is reached that is not a stuck node. The new end node may then be used to select a random walk of length ω from the table, and single random walk generator 307 may continue to generate the single random walk of length l as described above.

In some implementations, the single random walk generator 307 may extend the random walk of length ω ending in a stuck node by determining the nodes whose random walk of length ω has already been used to generate the single random walk of length l. For example, the single random walk generator 307 may reference the table to determine the nodes whose walk of length ω has already been used. The out edges from the nodes, as well as the out edges from the stuck node may be determined. The random walk of length ω that ended in the stuck node is then extended using the determined out edges to reach a new end node. If the new end node is not a stuck node (i.e., is a node from the subset of nodes that has not already been used to generate the single random walk), then the single random walk generator 307 may continue to generate the single random walk of length l as described above by selecting a random walk of length ω from the table and appending it to the new end node. If the new end node is also stuck node, then the single random walk generator 307 may extend the random walk again as described above until an end node that is not a stuck node is discovered. Because the nodes in the subset of nodes were sampled by the node selector 305 with a probability of α, it is therefore unlikely that the single random walk generator 307 will visit more than O(1/α) nodes before a non-stuck node is reached.

As may be noted from the description above, the single random walk generator 307 extending a random walk of length ω account for a stuck node, or multiple stuck nodes, may result in a generated single random walk that is greater than l. In some implementations, in order to account for the extended walks, the single random walk generator 307 may generate a single random walk of length l-ω, rather than l, by appending random walks of length ω from the table as described above. When the single random walk of length l-ω or greater is generated, the single random walk generator 307 may then extend the single random walk of length l-ω by following out edges from the end node of the single random walk of length l-ω until a single random walk of length l is generated, for example.

The node ranker 185 may further include a multiple random walk generator 309. The multiple random walk generator 309 may generate multiple random walks of length l, and based on the random walks of length l, determine the probability that a node from the subset of nodes selected by the node selector 305 appears in a random walk of length l. In some implementations, the multiple random walk generator 309 may alternatively determine the probability that a random walk of length ω originating at a particular node from the subset of nodes appears in a random walk of length l.

The multiple random walk generator 309 may use the single random walk generator 307 to generate the multiple single random walks of length l. In some implementations, the multiple random walk generator 309 may use the single random walk generator 307 to generate a predetermined number of walks of length l. The number of predetermined walks of length l may be a best estimate of the number of walks used to calculate an accurate prediction of the probability of a particular node appearing in a single random walk of length l, or may be based on other factors such as the mixing time of the graph represented in by the graph data 303, for example.

For example, assume the predetermined number of single random walks calculated to produce an accurate estimate of the probability of a particular node in the subset of nodes appearing a random walk selected by the node selector 305 is 100. The multiple random walk generator 309 may then generate 100 random walks of length l using the single random walk generator 307. The multiple random walk generator 309 may receive the 100 random walks of length l and use the 100 generated single random walks to count the number of times that a particular node from the subset of nodes selected by the node selector 305 appears in each of the single random walks. In some implementations, the multiple random walk generator 309 may count the number of times that a single random walk of length ω originating from a selected node appears in each of the 100 single random walks of length l.

The number of times a selected node appears in the single random walks of length l divided by the total number of single random walks of length l is the generated probability for the selected node. For example, if the selected node appears in 60 of the 100 single random walks of length l, then the probability for that node may be 0.60 (60/100).

In some implementations, rather than generate a predetermined number of single random walks, the multiple random walk generator 309 may have the single random walk generator 307 gradually increase the number of single random walks of length l generated until the calculated probabilities for one or more selected nodes from the subset of nodes are found to converge within a threshold. When the probabilities of the one or more nodes are determined to have converged within the threshold, the multiple random walk node generator 309 may stop having the single random walk generator 307 generate single random walks of length l and use the calculated probabilities as the probabilities for the one or more nodes. The convergence threshold may be selected by a user or administrator based on the available computing resources and the desired accuracy of the probabilities.

For example, in a first iteration, the multiple random walk generator 309 may have the single random walk generator 307 generate two single random walks of length l. The multiple random walk generator 309 may then calculate the probabilities of one or more nodes from the subset of nodes appearing in the random walks of length l as described above. In a second iteration, the multiple random walk generator 309 may have the single random walk generator 307 generate four single random walks of length l, and the multiple random walk generator 309 may then update the calculated probabilities for the one or more nodes. In a third iteration, the multiple random walk generator 309 may have the single random walk generator 307 generate eight single random walks of length l, and so forth. While the present example describes the number of single random walks generated at each iteration increasing by a power of two, it is for illustrative purposes only; the number of single random walks generated at each iteration may be increased by any desired factor or amount.

At the end of each iteration, the multiple random walk generator 309 may recalculate the probability of one or more of the nodes appearing in a single random walk of length l. When the calculated probability for a node or some of the nodes in the subset of nodes converges at a probability within the selected probability threshold, the multiple random walk generator 309 may stop having the single random walk generator 307 generate single random walks of length l.

Continuing the example described above, assume the selected convergence probability is 0.01; that is, when a calculated probability for a node, or some number of nodes, from the subset of nodes selected by the node selector 305 does not change by more than 0.01 between iterations, the iterations may be stopped by the multiple random walk generator 309. After the first iteration (i.e., two single random walks), the calculated probability for a node may be 0.20. After the second iteration (i.e., four single random walks), the calculated probability for a node may be 0.26. After the third iteration (i.e., eight single random walks), the calculated probability may be 0.25. Because the calculated probability of the node at the third iteration is within 0.01 of the probability computed for the node after the second iteration, the probability is within the 0.01 convergence threshold, and the multiple random walk generator 309 may stop calculating the probability for the node, and may also stop calculating the probability for the other nodes from the subset of nodes.

The node ranker 185 may further include a rank generator 311. As described above, in some implementations, the graph described by the graph data 303 may represent a set of web pages. When a search engine, such as the search engine 160, receives a query, the search engine fulfills the query by retrieving a set of links (i.e., URLs) to web pages from the search corpus 180 that are responsive to the provided query. However, there are often numerous web pages that are responsive to a particular query, thus the web pages may be presented in a way that reflects the relative importance of the web pages. One such solution is to present the web pages according to their rank. In some implementations, the rank of a web page may represent the probability that a user will end up on the web page after randomly selecting a link. Thus, web pages having a large number of links to them may have high ranks.

The rank generator 311 may infer the rank of a web page represented by a node from the graph described by the graph data 303. In particular, the rank generator 311 may infer the rank from the probability that a node is in a random walk of length l, as generated by the multiple random walk generator 309. In some implementations, the rank for a web page represented by a node may be directly inferred from the probability generated by the multiple random walk generator 309. That is, the rank for a web page represented by a node may be inferred directly from the computed probability that the node is in a random walk of length l.

In other implementations, the rank may be inferred from the calculated probability that the node is in a single random walk of length l, as well as other factors such as the rank of the web pages represented by the nodes that link to the node. Because the rank of a web page may be based in part on the number of links to the particular web page, nefarious users may be able to increase the rank of a web page by generating dummy web pages having links to the web page, or by posting multiple messages on message boards that include links to the web page. To discount the importance of such links in the rank calculation, links from web pages having high a rank may be "worth more" than links from web pages having a low rank. Thus, the rank generator 311 may use the inferred rank of nodes that link to a node to calculate the rank of that node in addition to the probability that the node appears in a single random walk of length l, for example. Other system, methods, and techniques for calculating the rank of a node in a graph may be used.

The node ranker 185 may further include a graph mixing time estimator 315. The mixing time estimator 315 may estimate the mixing time for the graph represented by the graph data 303. The approximate mixing time for a graph may be calculated by determining a length l such that a single random walk having l steps from an initial node distribution ends at a node that has a probability distribution that is close to the stationary distribution.

In some implementations, the mixing time estimator 315 may use the multiple random walk generator 309 to generate the probability distribution for the nodes in the subset of nodes for random walks of length l. The probability distribution may then be compared with the computed stationary distribution for the graph. If the computed probably distribution is $\epsilon$-near to a computed stationary distribution, then l is the approximate mixing time. Any known method or technique for computing the probability distribution at a node and the stationary distribution may be used.

The mixing time estimator 315 may determine the value of l where the probability distribution is $\epsilon$-near to the stationary distribution by trial and error. In some implementations, the mixing time estimator 315 may start by using the multiple random walk generator 309 to generate multiple random walks where l is 1. The probability distribution may then be calculated and compared to the stationary distribution. If the probability distribution is not $\epsilon$-near to the stationary distribution, the mixing time estimator 315 may increase the value of l by 1 (or 2, 3, 4, etc.) and use the multiple random walk generator 309 to generate multiple random walks with the new value of l. The probability distribution is then compared to the stationary distribution as described above, and if the probability distribution is again not $\epsilon$-near to the stationary distribution, the mixing time estimator 315 may again increase the value of l and again use the multiple random walk generator 309 to generate multiple random walks with the new value of l. The mixing time estimator 315 may continue using the multiple random walk generator 309 to generate multiple random walks of increasing values of l until the probability distribution is $\epsilon$-near to the stationary distribution.

In other implementations, the mixing time estimator 315 may double the value of l used by the multiple random walk generator 309 at each iteration. For example, at a first iteration, the value of l used by the multiple random walk generator 309 may be two. At a second iteration, the value of l used by the multiple random generator 309 may be four. At a third iteration, the value of l used by the multiple random walk generator 309 may be eight, and so forth. The mixing time estimator 315 may continue doubling the value of l used by the multiple random walk generator 309 until the probability distribution is $\epsilon$-near to the stationary distribution. Other multipliers may also be used. For example, the mixing time estimator 315 may increase the value of l by a factor of three, four, five, etc. at each iteration.

Figure 4:
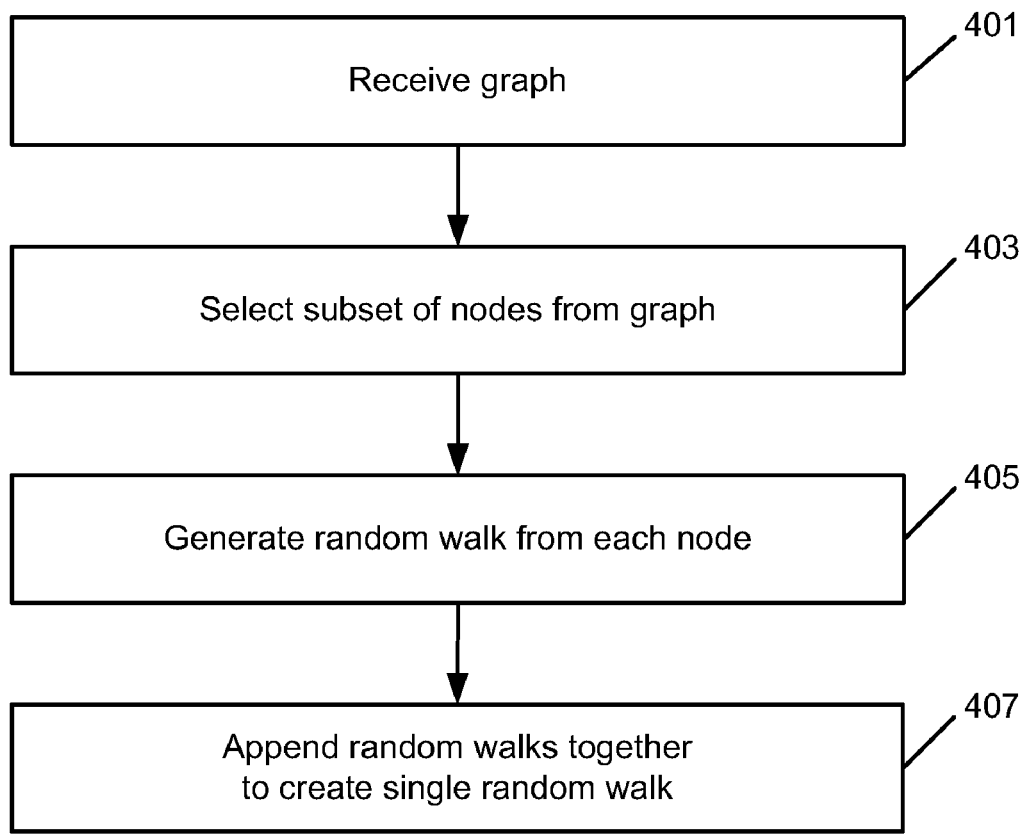
FIG. 4 is an illustration of an exemplary process for performing a random walk in a graph.

FIG. 4 is an illustration of an exemplary process 400 for performing a random walk in a graph. The process 400 may be performed by the single random walk generator 307 illustrated in FIG. 3, for example.

A graph is received (401). The graph may be received by the node ranker 185 and may include graph data 303. The graph may include a plurality of nodes connected by edges. The nodes of the graphs may represent web pages, and the edges may represent links from a source web page to a destination web page, for example. In some implementations, the graph may be streamed and received in system memory (e.g., RAM). The graph stream may be a randomized edge stream.

A subset of the nodes in the graph is selected (403). The subset of nodes may be selected according to a probability $\alpha$ by the node selector 305 illustrated in FIG. 3, for example. The probability selected for $\alpha$ may be between one and zero, where one may represent the sampling of every node in the graph and zero may represent sampling zero nodes in the graph. The value chosen for $\alpha$ may depend on the capabilities of the computer performing the sampling and a desired level of accuracy, for example.

A random walk is generated from each of the nodes in the subset of nodes of the graph (405). The random walks may be performed by the single random walk generator 307 illustrated in FIG. 3, for example. In some implementations, each random walk may be of a length $\omega$. The value selected for $\omega$ may be dependent on the size of the graph and a desired length l for a single random walk created from the random walks of length $\omega$.

In some implementations, the random walks may be generated by making passes over the graph stream. During a pass of the graph, for each of the random walks associated with the subset of nodes, an edge from a current node is randomly selected. The current node may then be updated to the destination node associated with the selected edge. After $\omega$ passes are made over the graph, a random walk of length $\omega$ is generated that originates from each of the nodes in the subset of nodes.

The random walks are appended to create a single random walk (407). The random walks of length $\omega$ may be appended to form a single random walk of approximately length l by the single random walk generator 307 illustrated in FIG. 3, for example.

In some implementations, the random walks of length $\omega$ may be appended by selecting one of the random walks of length $\omega$ originating from one of the nodes of the subset of nodes and determining the end node (i.e., the last node in the random walk of length $\omega$). A random walk of length $\omega$ is then selected that has a first node that is the same as the determined end node. The selected random walk is then appended to the determined end node. The process may continue until all or substantially all of the random walks of length $\omega$ have been appended together to form a single random walk of length l originating from the first node of the first selected random walk.

Figure 5:
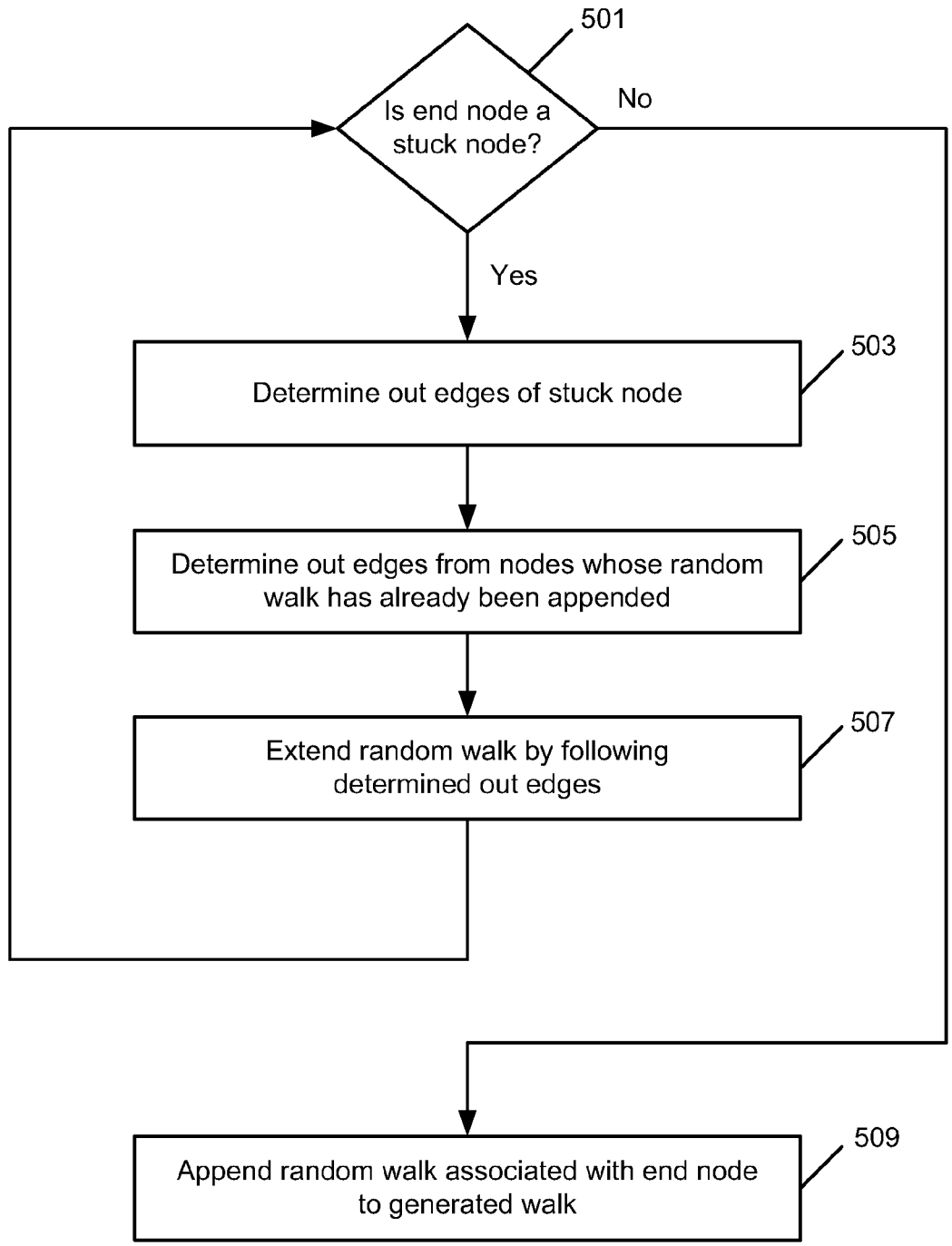
FIG. 5 is an illustration of an exemplary process for determining if an end node of a random walk is a stuck node and recovering from a stuck node.

In some implementations, where a random walk of length $\omega$ terminates in an end node that is a stuck node, the process may extend the random walk of length ω as described in the process 500 illustrated in FIG. 5. A stuck node may be an end node that is either not in the selected subset of nodes or that is a node whose random walk of length ω has already been used to create the random walk of length l, for example.

FIG. 5 is an illustration of an exemplary process 500 for determining if an end node of a random walk is a stuck node and recovering from a stuck node. The process 500 may be implemented by the single random walk generator 307 illustrated in FIG. 3, for example.

A determination is made as to whether an end node of a random walk is a stuck node (501). The determination may be made by the single random walk generator 307, for example. In some implementations, a stuck node is a node that is not in the subset of nodes (i.e., has no corresponding random walk of length ω) or is the start node of a random walk that has already been appended and used to create the single random walk of length l. If the end node is a stuck node, then the random walk of length ω may be extended to locate an end node that is not a stuck node (503). If the end node is not a stuck node, then the random walk of length ω associated with the end node is appended to the random walk of length l at the end node (509).

Out edges from the stuck node are determined (503). The out edges may be determined by the single random walk generator 307, for example. Because the original end node is a stuck node, the random walk of length ω may be extended to find a new end node that is not a stuck node. The out edges from the stuck node are edges from the stuck node that lead to other nodes on the graph. The other nodes may or may not be nodes in the subset of nodes.

Out edges from sampled nodes whose walk has already been appended are determined (505). The out edges may be determined by the single random walk generator 307, for example.

The out edges from the stuck node and the out edges from the sampled nodes are used to extend the random walk (507). The random walk may be extended by following the determined out edges by the single random walk generator 307, for example. In some implementations, the out edges may be followed until a non-stuck end node is reached. In other implementations, all the sampled out edges may be followed and new determination may be made if the new end node is a stuck node (501).

Figure 6:
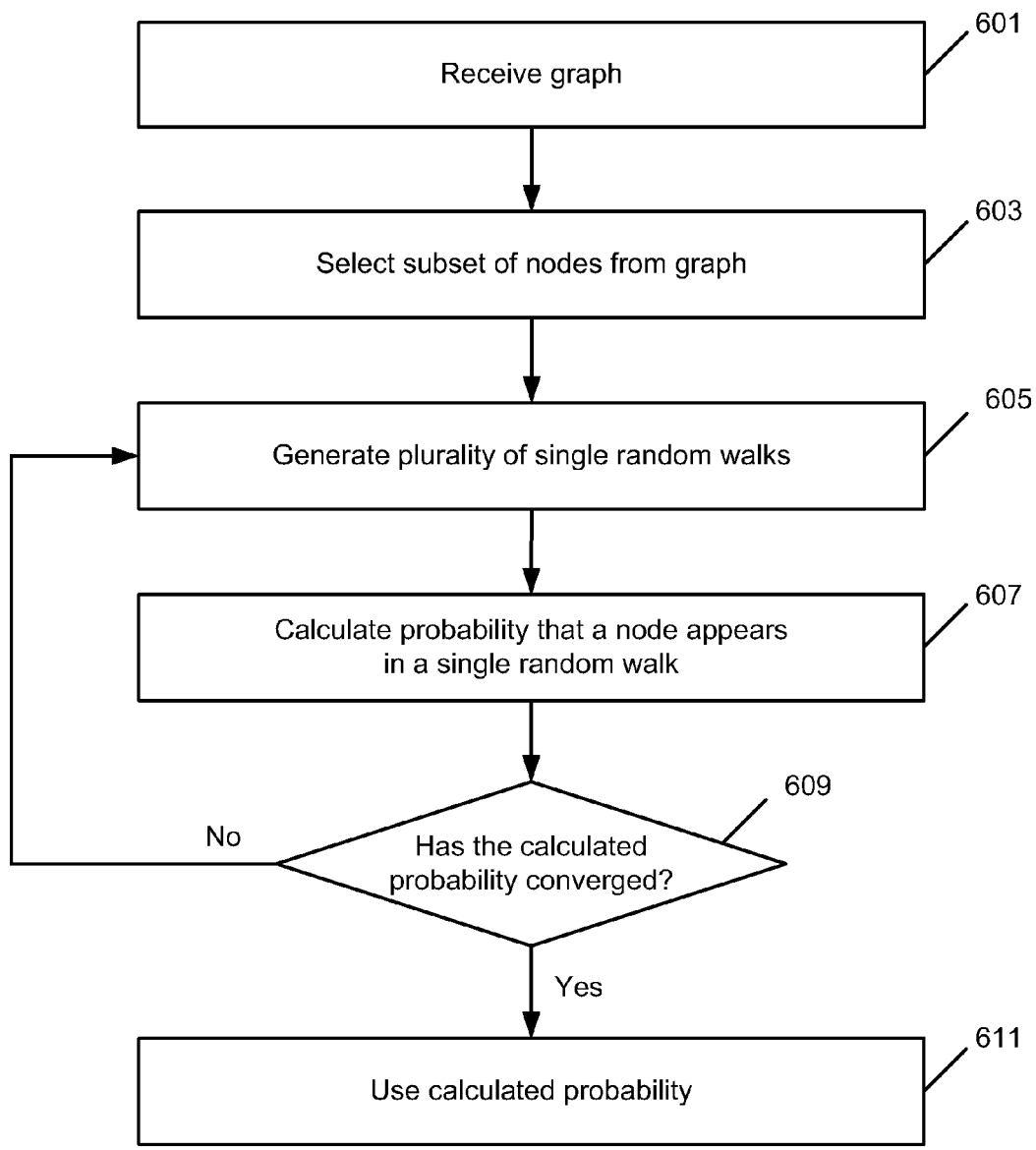
FIG. 6 is an illustration of an exemplary process for estimating the probability that a node from a graph is in a single random walk of the graph.

FIG. 6 is an illustration of an exemplary process 600 for estimating the probability that a node from a graph is in a single random walk of the graph. The process 600 may be implemented by the multiple random walk generator 309 illustrated in FIG. 3, for example.

A graph is received (601). The graph may be received by the node ranker 185 from the search corpus 180, for example. In some implementations, the graph may be received as a randomized edge stream. A subset of the nodes of the graph is selected (603). The subset of nodes may be selected by the node selector 305 according to a probability α, for example.

A plurality of single random walks is generated for the nodes in the subset of nodes (605). The single random walks may be generated by the single random walk generator 307, for example.

In some implementations, the plurality of single random walks is generated in iterations. At each iteration, a greater number of single random walks may be generated. In some implementations, the number of single random walks performed at each iteration may be doubled, tripled, or quadrupled over a previous generation. For example, at a first iteration a single random walk is generated of length l from the selected subset of the nodes of the graph. At a second iteration, two single random walks of length l may be generated. At a third iteration, four single random walks of length l may be generated, and so forth.

A probability of a node in the subset of nodes appearing in a single generated random walk is calculated or otherwise determined (607). The probability may be computed by the multiple random walk generator 309, for example. The probability may represent the probability that the node appears a random walk of length l. In some implementations, the determined probability for a node is updated for each iteration. The probability for a node may be calculated by the total number of times that node appears in a single random walk divided by the total number of nodes in the single random walk of length l. Where multiple single random walks are generated in an iteration, the probability for a node may be computed by dividing the number of times the node appears in the single random walks by the total number of nodes in the single random walks.

A determination may be made as to whether the calculated probability has converged (609). The determination may be made by the multiple random walk generator 309, for example. After some number of iterations, the probabilities computed for a node may begin to converge on a particular value. In some implementations, the current probability calculated for a node may be compared to the probability computed during a previous generation, and if the probabilities differ by less than a threshold amount, then the process may determine that the probability has converged. For example, if the probabilities are less than one hundredth of a percent apart, then the probabilities may have converged. Other thresholds may be used. The particular threshold selected may be based on the computational resources available (e.g., a lower threshold uses more iterations of the process), and the desired level of accuracy (e.g., some applications may not require a very accurate computation of the probability).

If the probability has converged, then the calculated probability for the node may be used as the probability that the node appears in a random walk of length l (611). Otherwise, the process 600 may increase the number of single random walks that are computed at the next iteration and generate another plurality of single random walks of length l (605).

Figure 7:
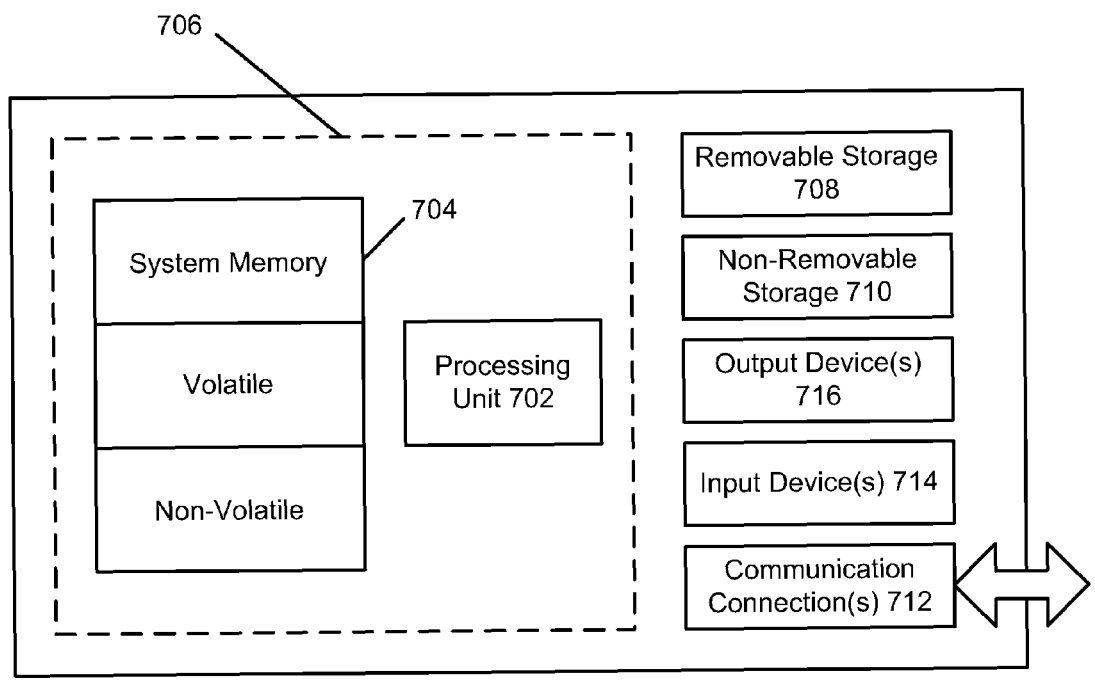
FIG. 7 shows an exemplary computing environment.

FIG. 7 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media can be any available media that can be accessed by device 700 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communication connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of ranking nodes in a graph, comprising:
   receiving a graph comprising a plurality of nodes and edges at a node ranker of a computer device;
   selecting a subset of the nodes of the graph using a node selector;
   generating a plurality of single random walks, wherein generating each single random walk comprises:
     generating a random walk for each of the nodes in the subset of the nodes of the graph using a random walk generator, each random walk comprising nodes reachable from a selected node in the subset of the nodes by following edges of the graph starting from the selected node;
     appending the generated random walks together to create the single random walk using the random walk generator, the single random walk being longer than each random walk for each of the nodes in the subset of the nodes of the graph; and
   determining a probability that a node from the subset of nodes appears in a single random walk using the generated plurality of single random walks.

2. The method of claim 1, wherein appending the generated random walks together to create the single random walk comprises:
   selecting a first generated random walk;
   determining if an end node of the first random walk is a stuck node; and
   if the end node of the first random walk is not a stuck node,
     selecting a second generated random walk, wherein the second generated random walk has a start node that is the same node as the end node of the first generated random walk; and
     appending the second generated random walk to the first generated random walk.

3. The method of claim 2, further comprising:
   if the end node of the first random walk is a stuck node,
     extending the first random walk until a node that is not a stuck node is reached;
     selecting a third generated random walk having a start node that is the same node as the reached node of the extended first random walk; and
     appending the third generated random walk to the extended first generated random walk.

4. The method of claim 1, wherein receiving the graph comprises receiving a graph stream.

5. The method of claim 1, wherein the nodes represent web pages and the edges represent links to web pages.

6. The method of claim 1, further comprising inferring a rank of a web page represented by the node from the determined probability.

7. A method for ranking nodes in a graph, comprising:
   receiving a graph comprising a plurality of nodes and edges at a node ranker of a computer device;
   selecting a subset of nodes of the graph using a node selector;

generating a first plurality of single random walks of the graph using a single random walk generator; and calculating a probability that a node appears in a single random walk of the graph using a multiple random walk generator and the generated first plurality of single random walks of the graph.

8. The method of claim 7, further comprising:

determining if the calculated probability for the node converges with a previously calculated probability for the node, and if the calculated probability for the node does not converge with a previously calculated node, generating a second plurality of single random walks of the graph; and calculating a probability that the node appears in a single random walk of the graph using the generated second plurality of single random walks.

9. The method of claim 8, wherein the second plurality of single random walks has twice the number of single random walks as the first plurality of single random walks.

10. The method of claim 7, further comprising inferring a rank of the node from the calculated probability.

11. The method of claim 7, wherein receiving the graph comprises receiving a graph stream.

12. The method of claim 11, wherein the graph stream is a randomized graph stream.

13. A system for ranking nodes, comprising:

a node selector adapted to select a subset of nodes from a graph comprising a plurality of nodes and edges;

a single random walk generator adapted to generate a plurality of single random walks, wherein the single random walk generator generates each random walk by:

generating a random walk for each of the nodes in the subset of nodes in the graph, wherein each random walk comprises nodes reachable from a selected node in the subset of nodes by following edges of the graph starting at the selected node; and appending the generated random walks together to generate the single random walk; and a multiple random walk generator adapted to:

receive the plurality of generated single random walks; and determine a probability that a node from the subset of nodes appears in a single random walk using the plurality of generated single random walks.

14. The system of claim 13, wherein the single random walk generator is adapted to append the generated random walks together to generate the single random walk by:

selecting a first generated random walk;

determining if an end node of the first random walk is a stuck node; and if the end node of the first random walk is not a stuck node, selecting a second generated random walk having a start node that is the same node as the end node of the first generated random walk; and appending the second generated random walk to the first generated random walk.

15. The system of claim 14, wherein the single random walk generator is further adapted to append the generated random walks together to generate a single random walk by:

if the end node of the first random walk is a stuck node, extending the first random walk until a node that is not a stuck node is reached;

selecting a third generated random walk, wherein the third generated random walk has a start node that is the same node as the reached node of the extended first random walk; and appending the third generated random walk to the extended first generated random walk.

16. The system of claim 13, wherein the nodes represent web pages and the edges represent links to web pages.

17. The system of claim 13, wherein the multiple random walk generator is further adapted to infer a rank of a web page represented by the node from the determined probability.

18. The system of claim 13, further comprising a mixing time estimator adapted to calculate the mixing time of the graph using the plurality of generated single random walks.

* * * * *